Jan. 9, 1968   K. BEYER-OLSEN ET AL   3,362,098
INFLATABLE BUOYANT BODY HAVING CONICAL FASTENING MEMBER THEREON
Filed May 17, 1965
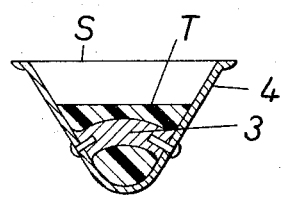
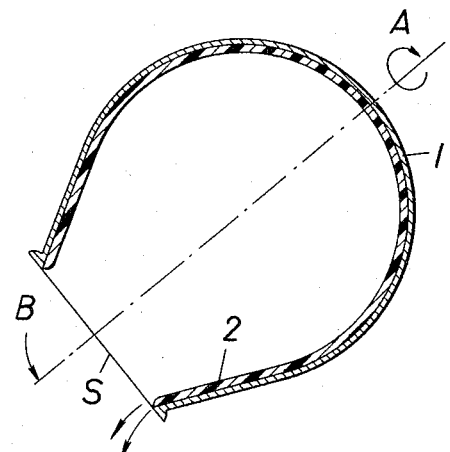
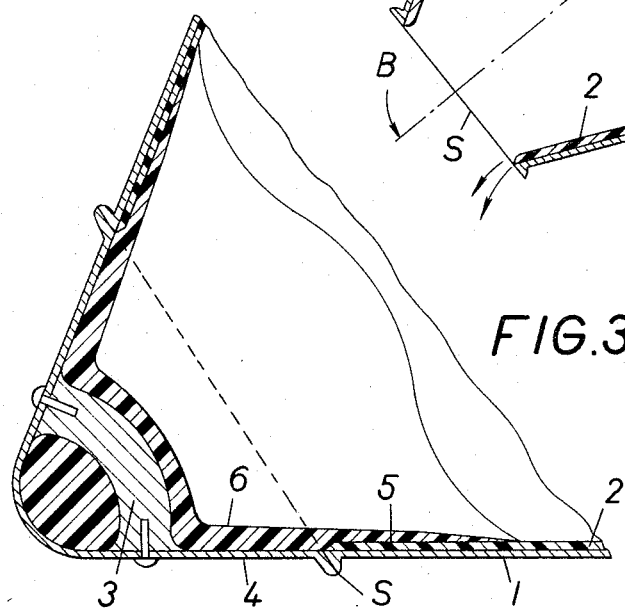
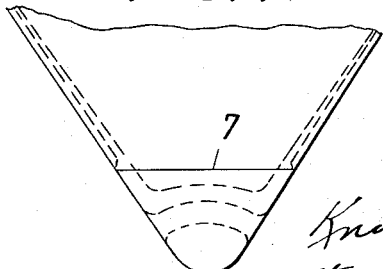

United States Patent Office 3,362,098
Patented Jan. 9, 1968

3,362,098
INFLATABLE BUOYANT BODY HAVING CONICAL FASTENING MEMBER THEREON
Knut Beyer-Olsen and Otto Steffenssen,
Aalesund, Norway
Filed May 17, 1965, Ser. No. 456,251
1 Claim. (Cl. 43—43.1)

ABSTRACT OF THE DISCLOSURE

An inflatable buoyant plastic body wherein a hollow conical fastening member having a wall is provided which decreases in thickness from the apex portion towards the edge, said apex portion being solid and having a passage therethrough from one point on the outside surface thereof to another point on the outside surface thereof for the passage of a rope therethrough, a hollow inflatable plastic bladder integrally joined to the conical fastening member over a conical surface portion of the outside surface of the fastening member, the fastening member wall overlapping a relatively large surface area of the plastic bladder on the inside face of same and being smoothly joined to the bladder.

---

The present invention relates to an inflatable buoyant body having a conical fastening member thereon. More particularly the invention relates to inflatable hollow bodies of plastic of the type consisting of two different parts, more precisely a softer bladder-shaped part and a smaller, preferably thicker and stiffer part, which is made with an opening for a rope.

Such inflatable hollow bodies have in recent years come into general use as floats, buoys, fenders, etc., as they have proved both practical and durable, and sufficiently robust to bear several years' service in connection with net and purse-seine fishing.

Many attempts have been made to produce such floats from a single material, i.e. the bladder part and the fastening member being made from the same type of material, but practice has shown that if such buoyant bodies are subjected to rough use, for instance, floating heavy fishing gear, it is only the dual construction having a fastening member made from a stronger, stiffer material that has yet proved to represent a satisfactory solution.

The applicants produce such inflatable hollow buoyant bodies by means of a process described in U.S. Patent No. 3,020,669 and which is in general characterized by the fact that the fastening member, which is suitably given the form of a wall sector about the axis of a closed rotary body, is produced initially in a separate operation out of a plastic material having relatively high tensile strength, whereafter said member is placed in a hollow, closed mould designed for casting of the float proper (bladder) and at rest against the inside of the hollow mould, and thereafter moulding said bladder in a second plastic material with greater pliability than the plastic inside fastening member, said moulding effecting such a sealing and binding relationship across adjacent interfaces of the member and bladder, that said member is constituting an integral part of the finished float.

The above process has proved itself very adequate since it makes it possible to produce on productive scale high quality floats and buoys of this type. The process has nevertheless certain limitations which have become apparent in connection with mass production of large hollow bodies, such as floats having a diameter of 30–40 inches or more, since it is of utmost importance that the production steps are absolutely reproducible, so that the products possess uniform characteristics and, furthermore, that the consumption of plastic material is kept as low as possible, without jeopardizing the required strength and quality of the product. Waste of plastic raw material due to casting failures and an unnecessary large consumption result in an unbearable increase of the production costs.

It is practically impossible to obtain an entirely uniform wall thickness during the rotary casting of the bladder, and the thinnest wall area must of course be sufficienty strong. This circumstance causes a per se useless increase in the general consumption of the plastic raw material. Since the object in question is a closed hollow body, there prevails no opportunity to control the bladder wall cross-section during or after it is moulded together.

A further problem in connection with the above described method is that it is very difficult to obtain a correct final hardening of the plastic material subsequent to that the bladder proper and the fastening member have been integrally joined together, because the variations in the plastic types and the varying thicknesses require of course different amounts of heat in order to attain a correct hardening.

The main object of the present invention is to provide an improvement of the above product, in which the above mentioned limitations are avoided; in other words, avoiding an undue consumption and loss of raw material, obtaining a better control during the bladder moulding operation and a proper hardening of the material in the assembled float.

These and other objects and advantages have been accomplished by the invention. The inflatable buoyant body in accordance with the invention is comprising a hollow conical fastening member having a wall which decreases in thickness from the apex portion towards the edge, said apex portion being solid and having a passage therethrough from one point on the outside surface thereof to another point on the outside surface for the passage of a rope therethrough, a hollow inflatable plastic bladder integrally joined to the conical fastening member over a conical surface portion of the outside surface of the fastening member, the fastening member wall overlapping a relatively large surface area of the plastic bladder on the inside face of same and being smoothly joined to the bladder, said fastening member being of a plastic which has a high tensile strength relative to the plastic in said bladder, said bladder being of a plastic having greater pliability than the plastic of said fastening member.

The method in providing the product of the invention comprises the steps of providing a two-part shell-shaped mould, comprising a substantially spherical larger part and a substantially conical smaller part, placing a first bladder plastic charge in said spherical part and depositing said charge as a smooth layer over the mould face by subjecting the mould to a suitable movement pattern such that the plastic covers the entire mould face out to the circumferential opening edge, placing a second fastening member plastic charge in the smaller conical mould part and closing the two-part mould, subjecting the closed two-part mould to a movement pattern for distributing the second plastic charge over the entire hollow conical mould face and further across the two-part mould joining line and over the inside face of the adjacent bladder wall and overlapping a circumferential area of same and integrally joining the bladder to the fastening member, and giving the assembled float a final curing treatment, whereafter the two-part mould is opened for removing the finished float from the mould.

Other objects and advantages of the invention will be apparent from the following description in conjunction with the drawing which illustrates a preferred embodiment of a float made in accordance with the method of the invention, and where:

FIG. 1 is a sectional elevation of the larger part of the two-part mould, the mould being in its final position at the end of the moulding of the bladder.

FIG. 2 is a section through the smaller mould part, a casting core being attached to the mould face and a fluent plastic charge being placed in the mould.

FIG. 3 is a sectional view in a greater scale of a part of the closed two-part mould and illustrating the operation step where the fastening member is being moulded to the bladder wall in an overlapping fashion and thus made integral with same.

FIG. 4 is a view showing the part of the finished hollow body including the fastening member.

Attention is drawn to the fact that in all figures the plastic wall thicknesses, in particular the bladder wall thickness, are shown in an enlarged scale for the sake of clarity.

As will be understood, the rotational moulding of the bladder as illustrated in FIG. 1 means that it is possible—both during and after the moulding—to control the course and the result of the casting, since the bladder mould has an opening. The casting is performed most suitably by initially positioning the mould 1 with the opening upwards, placing a suitable charge of plastic therein, for instance plasticol or a powder, performing the moulding by subjecting the mould to a combined rotational and tilting movement pattern, as indicated by the arrows A and B, simultaneously as the mould is subjected to heat and by tilting the mould downwards to the position shown in FIG. 1 towards the end of the moulding and rotating same such that the plastic material is covering the mould face to and along the mould opening. Possible surplus plastic material can be emptied out as shown with arrows in FIG. 1.

By performing the bladder moulding in this way a very even thickness can be attained, if necessary including a thickening in the pole sector of the mould and for instance a thinning of the wall towards the opening edge. In other words the moulding operation can be completely visually controlled, such that it is verified that the bladder material is being gelatinized in a uniform, smooth layer all the way out to the opening edge of the mould.

Subsequent to the moulding of the bladder as above described the bladder mould part including the bladder proper 2 is positioned with the opening pointing downwards, whereafter the smaller mould part 4 including a casting core 3 for the rope opening, as shown in FIG. 2, is attached to the bladder mould part, said mould part 4 beforehand being charged with a plastic charge T which shall constitute the fastening member. The closed two-part mould is then imparted a predetermined rotational and tilting movement pattern (if necessary heat is supplied), such that the plastic charge is gelatinized with decreasing wall thicknesses upwardly and towards and above the annular joint line S between the two mould parts as illustrated in FIG. 3, whereby there is provided an overlapping joint 5 between the bladder proper 2 and the subsequently moulded fastening member 6. It will be understood that by varying the plastic charge for the fastening member 6, the movement pattern and the actual dimensions of the mould, it is possible to give the fastening member 6 just the thickness, the size and the shape desired. The amount of overlapping can of course also be varied in accordance with the prevailing need. The moulding is suitably performed by using a suitable apparatus which can support the mould parts as well as the closed two-part mould and impart to the mould or mould part predetermined movement patterns. For example, if a very large amount of overlapping between the bladder and the fastening member is desired, one can use a relatively large plastic charge for the fastening member and during the moulding of same tilt the mould downwardly while rotating same until the central axis of the mould is positioned approximately horizontal as shown in FIG. 3.

It will be seen that the overlapping joint between the bladder and the fastening member will be the opposite of the overlapping joint obtained by the process in accordance with applicants' U.S. Patent No. 3,020,669.

The method in providing the product of the invention makes posisble a very reproducable moulding operation which is adaptable for mass production. A further advantage is that in contrast with former practice one obtains now an absolutely uniform, circular outer joint line, as indicated at 7 on FIG. 4, between the bladder proper and the fastening member, said line being determined by the two-part mould joint line. This feature renders a uniform transfer and distribution of the tensional stresses between the fastening member and the bladder proper when same is floating in the water and being attached to a submerged fishing gear. Additionally this feature gives the buoyant body an attractive appearance.

Having thus disclosed the invention, what is claimed is:

1. Inflatable buoyant body of plastic, comprising a hollow conical fastening member having a wall which decreases in thickness from the apex portion towards the edge, said apex portion being solid and having a passage therethrough from one point on the outside surface thereof to another point on the outside surface thereof for the passage of a rope therethrough, a hollow inflatable plastic bladder integrally joined to the conical fastening member over a conical surface portion of the outside surface of the fastening member, the fastening member wall overlapping a relatively large surface area of the plastic bladder on the inside face of same and being smoothly joined to the bladder, said fastening member being of a plastic which has a high tensile strength relative to the plastic in said bladder, said bladder being of a plastic having greater pliability than the plastic of said fastening member.

References Cited

UNITED STATES PATENTS 3,020,669  2/1962  Beyer-Olsen et al. ____ 43—43.1

FOREIGN PATENTS 4,535  1901  Great Britian.

SAMUEL KOREN, *Primary Examiner.*

D. J. LEACH, *Assistant Examiner.*